(12) United States Patent
Lehr

(10) Patent No.: US 7,597,721 B2
(45) Date of Patent: Oct. 6, 2009

(54) CONCENTRATED AQUEOUS COMPOSITIONS OF DYESTUFFS

(75) Inventor: Friedrich Lehr, Efringen-Kirchen (DE)

(73) Assignee: Clariant Finance (BVI) Limited, Tortola (VG)

( * ) Notice: Subject to any disclaimer, the term of this patent is extended or adjusted under 35 U.S.C. 154(b) by 470 days.

(21) Appl. No.: 10/581,572

(22) PCT Filed: Dec. 2, 2004

(86) PCT No.: PCT/IB2004/003968

§ 371 (c)(1),
(2), (4) Date: Jun. 2, 2006

(87) PCT Pub. No.: WO2005/054376

PCT Pub. Date: Jun. 16, 2005

(65) Prior Publication Data

US 2007/0101515 A1    May 10, 2007

(30) Foreign Application Priority Data

Dec. 4, 2003 (EP) .................................. 03027941

(51) Int. Cl.
C09B 62/01 (2006.01)
C09B 35/00 (2006.01)

(52) U.S. Cl. ................. 8/543; 8/449; 8/637.1; 8/638; 8/639; 534/685

(58) Field of Classification Search .......... 8/543, 8/549, 637.1, 638, 639; 534/685
See application file for complete search history.

(56) References Cited

U.S. PATENT DOCUMENTS

| 4,426,226 A | 1/1984 | Ohta et al. |
| 4,523,924 A | 6/1985 | Lacroix |
| 4,668,238 A | 5/1987 | Wicki |
| 4,702,744 A | 10/1987 | Wolff et al. |
| 4,838,895 A | 6/1989 | Galli et al. |
| 4,955,987 A | 9/1990 | Lacroix et al. |
| 5,145,485 A * | 9/1992 | Michna et al. .................. 8/527 |
| 5,739,298 A * | 4/1998 | Misawa et al. .............. 534/689 |
| 6,632,932 B1 | 10/2003 | Sawatari et al. |
| 6,719,906 B1 | 4/2004 | Malisz et al. |
| 7,060,124 B2 | 6/2006 | Wusik et al. |
| 7,297,200 B2 | 11/2007 | Wusik et al. |
| 7,371,831 B2 | 5/2008 | Oberholzer |
| 7,416,593 B2 | 8/2008 | Hasemann |
| 2005/0174410 A1 | 8/2005 | Hasemann et al. |
| 2007/0083040 A1 | 4/2007 | Hasemann |
| 2007/0186805 A1 | 8/2007 | Schene |
| 2007/0251030 A1 | 11/2007 | Oberholzer |
| 2008/0194815 A1 | 8/2008 | Berenguer et al. |
| 2008/0264297 A1 | 10/2008 | Pedrazzi |

FOREIGN PATENT DOCUMENTS

| CH | 648 584 A | 3/1985 |
| DE | 2508246 A1 * | 9/1976 |
| DE | 31 48 878 A | 6/1983 |
| EP | 0 029 960 A1 | 6/1981 |
| EP | 0 114 031 A2 | 7/1984 |
| EP | 0 201 458 A | 11/1986 |
| EP | 0 210 378 A2 | 2/1987 |
| EP | 0 288 434 | 10/1988 |
| EP | 0 446 732 A | 9/1991 |
| EP | 1 306 411 A | 5/2003 |
| GB | 2 015 018 A | 9/1979 |
| WO | WO 00/44569 A2 | 8/2000 |
| WO | WO 01/32786 | 5/2001 |
| WO | WO 02/094943 A | 11/2002 |

OTHER PUBLICATIONS

STIC Search Report dated Nov. 25, 2008.*
English Abstract of the Patent DE 2508246 A1.*
PCT International Search Report for PCT/IB2004/003968, dated Apr. 04, 2005.
PCT Written Opinion of the International Searching Authority for PCT/IB2004/003968, dated Apr. 04, 2005.
English abstract for EP 0 029 960, (1981).
English abstract for CH 648 584, (1985).
English abstrat for DE 31 48 878 A, (1983).

* cited by examiner

Primary Examiner—Eisa B Elhilo
(74) Attorney, Agent, or Firm—Tod A. Waldrop

(57) ABSTRACT

The present invention relates to a process for producing storage-stable concentrated aqueous dye preparations of anionic dyes, to the dye preparations as such, blends/shadings with further anionic dyes and to their use, especially for printing and dyeing fiber materials.

14 Claims, No Drawings

CONCENTRATED AQUEOUS COMPOSITIONS OF DYESTUFFS

The present invention relates to a process for producing storage-stable concentrated aqueous dye preparations of anionic dyes, to the dye preparations as such, blends/shadings with further anionic dyes and to their use, especially for printing and dyeing fibre materials.

The use of water-soluble dyes in the form of concentrated aqueous solutions which are often referred to as "liquid dyes" in the art has gained industrial importance in recent years for the dyeing of paper and textiles.

The main advantages of such concentrated aqueous dye preparations over pulverulent dyes are the avoidance of dust in handling and the ease and speed with which liquid dyes can be metered, especially for setting printing pastes and of padding and dyeing liquors, also the avoidance of wetting problems due to clumping, and spotty dyeings due to undissolved dye particles. Such liquid formulations should be highly concentrated (dye content not less than 5% by weight and preferably 20% by weight, more preferably 8% by weight to 15% by weight) and be keepable for not less than several months within a broad temperature range (−20° C. to +50° C.) without changes, (separations, precipitations etc.) i.e. without changing the performance characteristics.

Ideally, a concentrated aqueous dye preparation consists of an aqueous solution of the dye, in which case the problems of disposal or recovery, which arise when organic solvents are used instead of water, are avoided. But often the solubility of the dye in water is not sufficient to give aqueous solutions in the concentrations desired for use as concentrated aqueous dye preparations, i.e. at least 5% by weight. It is prior art (see for example EP-A-446 732) to add solubilizers to achieve a concentrated aqueous dye preparation, but this leads to undesirable organic materials in dyehouse wastewaters.

The present invention therefore had for its object to produce concentrated liquid preparations of anionic dyes that are stable for several months and are suitable especially for the dyeing and printing of paper and also for the production of padding liquors, dyebaths and printing pastes for dyeing and printing textile materials, without additional solubilizers.

It has now been found that such storage-stable preparations may be achieved by subjecting certain anionic dyes to an ultrafiltration or diafiltration (membrane separation process) in order to remove salts and synthesis byproducts and by subsequent concentration of the obtained filtrated dye solution.

The invention accordingly provides a process for producing storage-stable concentrated aqueous preparations of anionic dyes characterized in that an aqueous solution or suspension of at least one anionic crude dye of the formula (I)

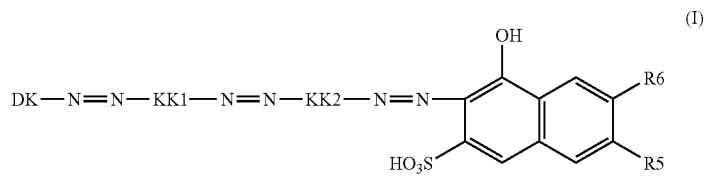

(I)

wherein

DK is phenyl or naphtyl or phenyl groups or naphtyl groups substituted by —SO$_3$H, —COOH, —OH, —NH$_2$, or by C$_{1-4}$-alkyl groups which are unsubstituted or which are further substituted by —OH, —COOH, —NH$_2$, —NHalkyl, —N(alkyl)$_2$, or by C$_{1-4}$-alkoxy groups which are unsubstituted or which are further substituted, by —SO$_3$H, —COOH or —OH, KK1 and KK2 independently from each other are phenylen or naphtylen or phenylen groups or naphtylen groups which are unsubstituted or which are further substituted by —OH, —COOH, —NH$_2$, —NHalkyl, —N(alkyl)$_2$, or by C$_{1-4}$-alkoxy groups which are unsubstituted or which are further substituted, by —SO$_3$H, —COOH or —OH, R5 and R6 independently from each other are —H, —NH$_2$, —NH—C$_6$H$_5$, —NH—CO—CH$_3$ or —NH—CO—C$_6$H$_5$, is subjected to ultrafiltration and subsequent concentration, and wherein no additional solubilizers, dispersants or tensides are used.

Preferred dyes according to the formula (I) are those wherein

DK has the same meaning as above,

KK1 and KK2 independently from each other are naphtylen or substituted naphtylen with the same meaning of the substituting groups as above, R5 and R6 have the same meaning as above.

More preferred dyes according to the formula (I) have the formula (II)

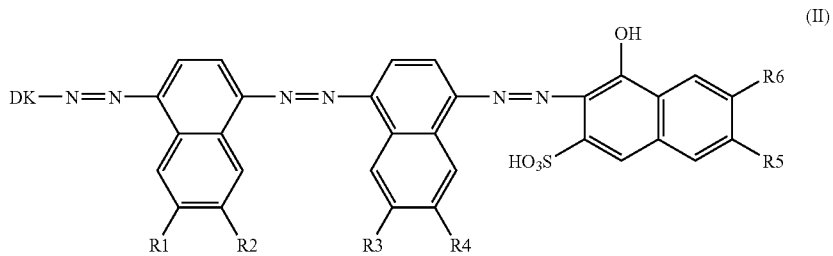

DK has the same meaning as above,
R1 to R4 independently from each other are —H, —SO₃H, —NH₂ or —COOH,
R5 and R6 have the same meaning as above.

In preferred compounds of formula (II) DK has the formula

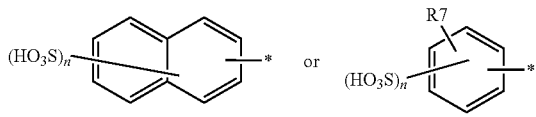

where the asterix shows the point of attachment and n is 1 or 2. In a more preferred embodiment DK is a naphtyl group and n is 2 and R7 is —H or —NH2.

In more preferred compounds according to the formula (II) DK is

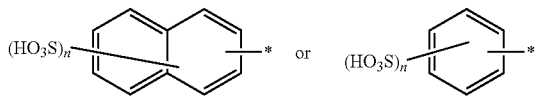

where the asterix shows the point of attachment and n is 1 or 2,
R1 to R4 independently from each other are —H or —SO₃H,
R5 and R6 have the same meaning as above.

In even more preferred compounds of the formula (II) DK is

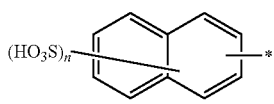

where the asterix shows the point of attachment and n is 1 or 2,
R1 to R4 independently from each other are —H or —SO₃H,
R5 and R6 independently from each other are —H or —NH₂.

The preferred anionic dyes according to the formula (I) and/or (II) are neither transition metal compounds nor transition metal complexes. Preferred anionic dyes are dyes according to formula (II), and C.I. Direct Blue 71 is particularly preferred.

The invention accordingly provides a process which is characterized in that an aqueous solution or suspension of at least one anionic crude dye is pressed through a semipermeable membrane by applying a hydrostatic pressure to remove salts and synthesis byproducts having molecular weights below 500 and some water by means of the membrane.

In a preferred embodiment the retentate is continuously or intermittently replaced or supplemented by water or buffer solution so that the volume of the batch changes only minimally, if at all. In other words, the dye concentration remains constant or substantially constant. The dye concentration of the retentate does not change by more than 20% in a preferred embodiment, by not more than 10% in particularly preferred processes and by not more than 5% in very particularly preferred processes.

Following this ultrafiltration, the dye solution is brought to the desired concentration by concentrating.

The membranes used in the process of the present invention are TFM™ membranes, for example the G10, G20, G50 or DL5 membranes from GE Osmonics Desal (GE Osmonics Inc., 5951 Clearwater Drive, Minnetonka, Minn. 55343, United States), of which the DL5 membrane is particularly preferred.

In a further, alternative version of the process according to the present invention, the counterions of the anionic dyes are exchanged, or further cations added, prior to diafiltration. The newly added cations mean that the original cations are easily removable through ultrafiltration or diafiltration. The counterions of the anionic functions are exchanged by alkanolamine or alkanolammonium salts in a particularly preferred embodiment and by triethanolamine, 1-Amino-2-propanol or triethanolammonium hydrochloride in a very particularly preferred embodiment.

The present invention further provides for the production of stable liquid formulations of anionic dyes by ultrafiltration of the aqueous solution or suspension of the crude dye.

The solutions of the present invention can be shaded or blended with further anionic dyes. Preference is given to using liquid direct dyes and particular preference is given to shading or blending with C.I. Direct Blue, C.I. Direct Violet, C.I. Direct Yellow, and Direct Turquoise dys, particularly preferred versions of C.I. Direct Blue, C.I. Direct Violet, C.I. Direct Yellow and Direct Turquoise dys being C.I. Direct Blue 218 C.I., Direct Blue 267, C.I. Direct Blue 279, C.I. Direct Violet 35, C.I Direct Yellow 137,. C.I Direct Yellow 168,. C.I Direct Yellow 147,. C.I Direct Yellow 170, C.I Direct Yellow 148:1, C.I Direct Yellow 157 and the dyestuff from example 1 from Kokai 1-297468 of Nippon Kayaku (filed on 26 May 1988).

This provides storage-stable concentrated dye solutions which are purely water based and which comprise less than 1% by weight preferably less than 0.5% by weight of inert salts and electrolytes which, having been used to neutralize and/or salt the dye out, come from the synthesis and are carried along in the synthesis solution or suspension, such as alkali metal or alkaline earth metal salts, for example ammonium, magnesium chloride, magnesium sulphate, magnesium bisulphate, sodium chloride, sodium sulphate, sodium bisulphate, potassium chloride, potassium sulphate or potassium bisulphate, especially sodium chloride.

No further additive, such as surface-active substances (surfactants) is added before and/or after passage through the semipermeable membrane, except as or when required, a biocide. Any biocide is suitable. But preference is given to using biocides having FDA and/or BGVV approval. Any biocide capable of controlling the growth of Gram-positive or Gram-negative bacteria, yeasts or fungi can be used in the solutions of the present invention. Suitable biocides are for example thiazol-3-one derivatives, for example alkyl and/or chlorinated thiazol-3-one derivatives or mixtures thereof. Typically, the biocides are added in an amount of 15 parts by weight per million parts by weight of the composition (ppm) to up to 1000 ppm; particular preference is given to 50 ppm to 500 ppm (parts by weight per ready-produced composition).

beams, boards or finished objects like furniture, parts of buildings is a preferred use of the wood stains according to the invention. The application of the liquid formulations according to the invention may be carried out over the whole or part of the wood's surface (to compensate for color defects in the wood or veneer). The liquid formulations according to the invention may be used in water stains (main solvent water), solvent stains (ca. 30-95% organic solvent), or chemical stains (which are generally water thinnable).

EXAMPLES

Example 1a 670 g of dye of the formula (1)

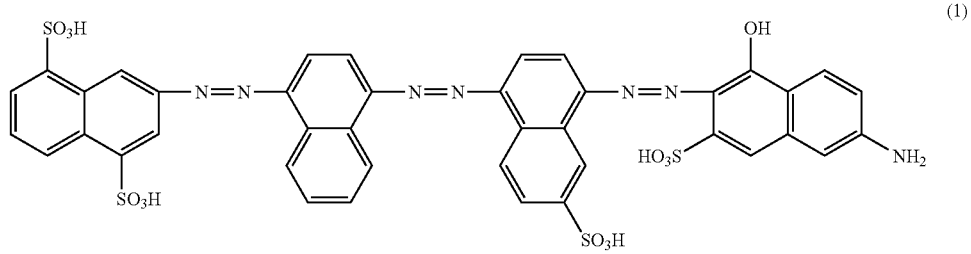

A possible or preferred biocide is Proxel GXL™ (Proxel™ is a trademark of Zeneca AG Products, Inc. and comprises 1,2-benzisothiazolin-3-ones (CAS No: 2634-33-5)).

The liquid dye preparations of the present invention comprise in particular 10 to 60 per cent by weight of at least one anionic dye, 90 to 40 per cent by weight of water, not more than 1 per cent by weight of inorganic inert salt and 0.05% to 0.3% by weight of biocide or preferably 0. 1% to 0.2% by weight of biocide based on the entire preparation.

The preparations are characterized by an inorganic inert salt content of not more than 1% by weight, especially of not more than 0.5% by weight and preferably of not more than 0.1% by weight, based on the liquid preparation.

The exact composition of the dye preparations depends on the anionic type of dye used.

The invention further provides the storage-stable concentrated aqueous dye preparations obtained by the process according to the present invention and also their use for dyeing and printing paper and for producing padding liquors, dyers' baths and printing pastes used for dyeing and printing textile materials, especially textile materials composed of cellulose, synthetic polyamide and wool.

The present invention further provides for the use of the present invention's dye preparations of anionic dyes for printing and dyeing fibre materials, especially for dyeing and printing paper and also for producing padding liquors, dyebaths and printing pastes for dyeing and printing textile materials.

The present invention further provides for the use of the present invention's dye preparations of anionic dyes for producing ink jet inks and the ink jet inks produced therefrom.

The present invention further provides for the use of the present invention's dye preparations of anionic dyes for producing wood stains for staining solid wood or wood chippings or chipboards or wood fibre boards. Staining wood in form of in the form of a moist presscake having a titanometric titre of 43.85% are suspended in 8000 ml of demineralized water in a 10 l glass beaker. The suspension is heated to 60° C., and the dye dissolves. 25 g of Hyflo-Supercel filter earth are added before stirring for about 15 min and a subsequent clarifying filtration through a porcelain suction filter with absorbent pad. The dye solution obtained (8583 g, ca 8300 ml) is ultrafiltered in a laboratory ultrafiltration system having a DL5 membrane at 48-50° C. and a pressure of 12 bar (the volume of the retentate is kept substantially constant) until the conductivity in the permeate is 0.1 mS/cm and chloride ions are no longer detectable in the permeate with silver nitrate solution. This requires about 32 000 ml of demineralized water. The retentate is then concentrated at about 50° C. and a pressure of 12 to 15 bar to 2560 g (titanometric titre=11.12%).

Example 1b 340 g of dye solution from Example 1a are adjusted with 38.1 g of demineralized water to 378.1 g (titanometric titre=10.0%). The dye solution obtained yielded impeccable (perfect) visual stability assessment after each of:

storage at room temperature for several months (assessment after 1, 2, 3 and 5 months)
heat test, 2 weeks, +50° C.
refrigerator test, 2 weeks, +3° C.
cold test, 2 days, −20° C.

Comparative Examples a) to h)

In each case 340 g of dye solution from Example 1a are adjusted with 28.4 g (7.5%) of the following organic additives (typical standardizers) and also with 9.7 g of demineralized water to likewise 378.1 g (titanometric titre=10.0%):

| | |
|---|---|
| Comparative example a) | benzyl alcohol |
| Comparative example b) | ethylene glycol monobutyl ether |
| Comparative example c) | 1,2-propylene glycol |
| Comparative example d) | ethylene glycol |
| Comparative example e) | diethylene glycolamine |
| Comparative example f) | triethanolamine |
| Comparative example g) | sulpholane |
| Comparative example h) | POE-(9)-TEA (polyglycolamine from 1 eq. of triethanolamine and 3 eq. of propylene oxide) |
| Comparative example i) | caprolactam |

The liquid formulations a), b), c), e), f) and g) were precipitated after 24 h at RT, formulation d) after 48 h and i) and j) after about one month.

Example 2

680 g of dye solution from Example 1a are adjusted with 1.4 g of Proxel™ GXL biocide and with 224.2 g of demineralized water to 905.6 g (titanometric titre=8.35%). The dye solution obtained yielded impeccable (perfect) visual and microscopic stability assessment after each of:
storage at room temperature for several months (assessment after 1, 2, 3 and 5 months)
heat test, 2 weeks, +50° C.
refrigerator test, 2 weeks, +3° C.
cold test, 2 days, −20° C.

Example 3a 387.1 g of dye of the formula 1 in the form of a moist presscake having a titanometric titre of 43.85% are suspended with 3400 ml of demineralized water and also 53.6 g of triethanolamine, and adjusted to pH 10.5 with about 2.5 ml of 30% aqueous sodium hydroxide solution, in a 10 l glass beaker. The suspension is heated to 50° C., and the dye dissolves. 25 g of Hyflo-Supercel filter earth are added before stirring for about 15 min and a subsequent clarifying filtration through a porcelain suction filter with absorbent pad, the residue being washed with about 80 ml of demineralized water. The dye solution obtained (5345 g, ca 5200 ml) is concentrated to about 2700 ml at 48-50° C. and a pressure of 12 bar in a laboratory ultrafiltration system having a G 50 membrane. 1600 ml of a triethanolammonium hydrochloride solution (pH=7.0) are added, the solution having been prepared from 367 g of triethanolamine, 700 g of demineralized water, 300 g of ice and also about 290 ml of 30% hydrochloric acid solution at RT. This is followed by ultrafiltration (the volume of the retentate is kept substantially constant) until the conductivity in the permeate is 0.1 mS/cm and chloride ions are no longer detectable in the permeate with silver nitrate solution. This requires about 36 000 ml of demineralized water. The retentate is then concentrated at about 50° C. and a pressure of 12-15 bar to 1606 g (titanometric titre=10.25%).

Example 3b 651 g of dye solution from Example 3a are adjusted with 16.3 g of demineralized water to 667.3 g (titanometric titre=10.0%). The dye solution obtained yielded impeccable (perfect) visual and microscopic stability assessment after each of:
storage at room temperature for several months (assessment after 1, 2, 3 and 5 months)
heat test, 2 weeks, +50° C.
refrigerator test, 2 weeks, +3° C.
cold test, 2 days, −20° C.

The dyestuffs according to table 1 were used to prepare liquid aqueous formulations following the general procedure according to the example 1 but using the dyestuff according to the table 1 instead of the dyestuff of the formula (1) leading to the examples. These examples 4 to 12 were tested according to the example 2.

TABLE 1

Examples 4 to 12

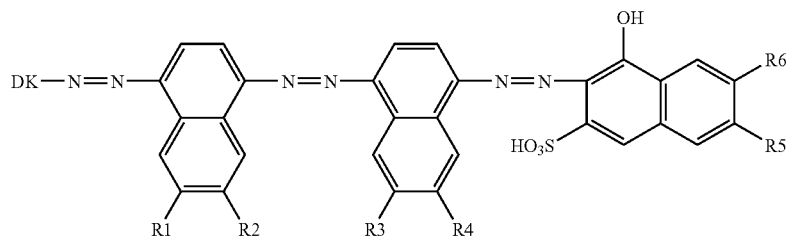

| Ex. No | DK | R1 | R2 | R3 | R4 | R5 | R6 |
|---|---|---|---|---|---|---|---|
| 4 | 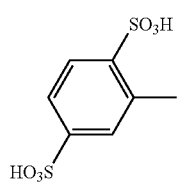 | H | H | $SO_3H$ | H | $-NH-C_6H_5$ | H |

TABLE 1-continued

Examples 4 to 12

[Structure: DK—N=N—[naphthalene with R1, R2]—N=N—[naphthalene with R3, R4]—N=N—[naphthalene with OH, SO3H, R5, R6]]

| Ex. No | DK | R1 | R2 | R3 | R4 | R5 | R6 |
|---|---|---|---|---|---|---|---|
| 5 | 3-sulfophenyl | H | SO$_3$H | H | SO$_3$H | —NH$_2$ | H |
| 6 | 3-sulfophenyl | SO$_3$H | H | SO$_3$H | H | —NH—C$_6$H$_5$ | H |
| 7 | 2-methyl-1,4-disulfophenyl | H | SO$_3$H | H | H | —NH—C$_6$H$_5$ | H |
| 8 | 2-amino-3-sulfo-4-methylphenyl | SO$_3$H | H | SO$_3$H | H | —NH—CO—C$_6$H$_5$ | H |
| 9 | 3-sulfophenyl | H | H | SO$_3$H | H | —NH$_2$ | H |
| 10 | phenyl | SO$_3$H | H | SO$_3$H | H | H | —NH$_2$ |
| 11 | phenyl | H | SO$_3$H | H | SO$_3$H | H | —NH$_2$ |
| 12 | 1,3-disulfo-7-methylnaphthyl | H | SO$_3$H | H | H | H | —NH—CO—CH$_3$ |

The dye solution obtained according to the examples 2 to 12 yielded impeccable visual and microscopic stability assessment after each of:
- storage at room temperature for several months (assessment after 1, 2, 3 and 5 months)
- heat test, 2 weeks, +50° C.
- refrigerator test, 2 weeks, +3° C. cold test, 2 days, −20° C.

Example 13

66 parts of the dye solution from example 2 are mixed with 34 parts of an approximately 10% solution of Direct Violet 35. The solution obtained has long term stability and dyes paper in a reddish blue shade.

Example 14

29 parts of the dye solution from example 2 are mixed with 71 parts of an approximately 10-15% solution of Direct Blue 218. The solution obtained has long term stability and dyes paper in a greenish blue shade.

Example 15

50 parts of the dyestuff solution from example 2 are mixed with 50 parts of a ca. 14% solution of Direct Blue 267. The resulting dyestuff solution exhibits perfect longterm stability and dyes paper in reddish blue shades.

Example 16

50 parts of the dyestuff solution from example 2 are mixed with 50 parts of a ca. 10-15 % solution of Direct Blue 279. The resulting dyestuff solution exhibits perfect longterm stability and dyes paper in reddish blue shades.

Example 17

47 parts of the dyestuff solution from example 2 are mixed with 53 parts of a ca. 15% solution of the dyestuff from example 1 from Kokai 1-297468 of Nippon Kayaku (filed on 26 May 1988). The resulting dyestuff solution exhibits perfect longterm stability and dyes paper in greenish blue shades.

Example 18

48 parts of the dyestuff solution from example 2 are mixed with 2 parts of a ca. 13% solution of Direct Yellow 137 and 50 parts of a ca. 15% solution of the dyestuff from example 1 from Kokai 1-297468 of Nippon Kayaku (filed on 26 May 1988). The resulting dyestuff solution exhibits perfect long-term stability and dyes paper in greenish blue shades.

Example 19

49 parts of the dyestuff solution from example 2 are mixed with 2 parts of a ca. 12% solution of Direct Yellow 168 and 49 parts of a ca. 15% solution of the dyestuff from example 1 from Kokai 1-297468 of Nippon Kayaku (filed on 26 May 1988). The resulting dyestuff solution exhibits perfect long-term stability and dyes paper in greenish blue shades.

Example 20

50 parts of the dyestuff solution from example 2 are mixed with 2 parts of a ca. 17% solution of Direct Yellow 147 and 48 parts of a ca. 15% solution of the dyestuff from example 1 from Kokai 1-297468 of Nippon Kayaku (filed on 26 May 1988). The resulting dyestuff solution exhibits perfect long-term stability and dyes paper in greenish blue shades.

Example 21

47 parts of the dyestuff solution from example 2 are mixed with 2 parts of a ca. 17% solution of Direct Yellow 170 and 51 parts of a ca. 15% solution of the dyestuff from example 1 from Kokai 1-297468 of Nippon Kayaku (filed on 26 May 1988). The resulting dyestuff solution exhibits perfect long-term stability and dyes paper in greenish blue shades.

Example 22

52 parts of the dyestuff solution from example 2 are mixed with 4 parts of a ca. 10% solution of Direct Yellow 148:1 and 44 parts of a ca. 15% solution of the dyestuff from example 1 from Kokai 1-297468 of Nippon Kayaku (filed on 26 May 1988). The resulting dyestuff solution exhibits perfect long-term stability and dyes paper in greenish blue shades.

Example 23

52 parts of the dyestuff solution from example 2 are mixed with 3 parts of a ca. 13% solution of Direct Yellow 157 and 45 parts of a ca. 15% solution of the dyestuff from example 1 from Kokai 1-297468 of Nippon Kayaku (filed on 26 May 1988). The resulting dyestuff solution exhibits perfect long-term stability and dyes paper in greenish blue shades.

Dyeing Prescriptions

Dyeing Prescription A 70 parts of chemically bleached pinewood sulphite cellulose and 30 parts of chemically bleached birchwood sulphite cellulose are beaten into 2000 parts of water in a hollander. 1.5 parts of the liquid dye preparation from Example 1b are added to the stuff. Paper is made therefrom after a mixing time of 20 minutes. The absorbent paper obtained in this way has a bluish violet colour.

Dyeing Prescription B 1.5 parts of the liquid dye preparation from Example 1b are added to 100 parts of chemically bleached sulphite cellulose beaten with 2000 parts of water in a hollander. After mixing through for 15 minutes, customary sizing is effected using resin size and aluminium sulphate. Paper made from this material exhibits a bluish violet hue in each case.

Dyeing Prescription C

An absorbent web of unsized paper is pulled at 40-50° C. through an aqueous dye solution consisting of 95 parts of water and 5 parts of the inventive dye solution of Example 1b.

Excess dye solution is squeezed by two rolls. The dried web of paper has a bluish violet colour in each case.

The dye preparations of Examples 2 to 23 can be used for dyeing similarly to prescriptions A to C.

Dyeing Prescription D 5 parts of the dye preparation from Example 1b are metered into 4000 parts of softened water at room temperature. 100 parts of prewetted woven cotton fabric are introduced into the bath, followed by heating to the boil over 30 minutes. The bath is held at the boil for an hour during which evaporated water is made good from time to time. The dyeing is then removed from the liquor, rinsed with water and dried. The dyeing obtained has a bluish violet colour.

The dye preparations of Examples 2-23 can be used for dyeing cotton in a similar manner.

Dyeing Prescription E 100 parts of freshly tanned and neutralized chrome grain leather are drummed for 30 minutes in a float of 250 parts of water at 55° C. and 0.5 part of the dye preparation made according to Example 1b and are treated for a further 30 minutes in the same bath with 2 parts of an anionic fatliquor based on sulphonated fish oil. The leathers are conventionally dried and finished. The leather obtained has a level scarlet hue.

Further low-affinity, vegetable-retanned leathers can likewise be dyed according to known methods.

Dyeing can be done in a similar manner with the dyes of Examples 2-23.

Dyeing Prescription F 15 kg waste paper (wood based), 25 kg bleached ground wood and 10 kg not bleached sulphite cellulose were beaten until a 3% aqueous suspension was obtained. This suspension of wood fibres was thinned to a 2% aqueous suspension and under continuously stirring the suspension the following chemicals were added (based on the dry fibre content of the suspension) 5% Kaolin (china clay) and 1.25 kg of a 5% solution (made acidic with acetic acid) of the dye solution from the example 2. After 20 minutes 1% based on the dry fibre content of a resin-glue dispersion was added. The homogenous suspension was brought to pH 5 by adding alum shortly before the paper suspension was transferred to the paper maschine. On a paper maschine a blue paper was produced.

Dyeing can be done in a similar manner with the dyes of Examples 2-23.

Dyeing Prescription G

A dry mixture comprising 40% not bleached ground wood and 60% sulphite cellulose were beaten with water in a Holländer to a ground grad of 40 SR. The suspension was thinned with water to comprise 2.5% of dry fibres.

200 parts of fibres were contacted with 5 parts of a dye solution according to the example 2 and stirred for 5 minutes, 2% resin-glue and 4% alum based on the drye wheat of fibres. The mixture was stirred again for several minutes and the paper was produced as described in the Dyeing prescription F: a blue paper was obtained.

Dyeing can be done in a similar manner with the dyes of Examples 2-23.

Dyeing Prescription H

A Ink Jet composition of the ink jet printing comprising
6 parts of the dye from example 2,
20 parts of glycine and
74 parts of water
was produced.

This ink jet ink composition was used for printing of paper or papery substrates, textile material and plastic transparencies by filling the ink in a commercially available ink jet printer in the required dilution. For testing purpose, a one-colour print was produced on one of the above-mentioned substrates.

Dyeing can be done in a similar manner with the dyes of Examples 2-23.

Dyeing Prescription I

A batten of coniferous wood (European spruce) and a batten of leafy wood (beech) were each cut into pieces of about 5 cm and immersed for some minutes in a thinned (10 parts water and 1 part of the dye solution according to example 2) solution according to example 2 and after drying for then hours light blue batten pieces were obtained.

Dyeing can be done in a similar manner with the dyes of Examples 2-23.

The invention claimed is:

1. A process for producing a storage-stable concentrated aqueous preparation of an anionic dye comprising the steps of providing an aqueous solution or suspension of at least one anionic crude dye of the formula (I)

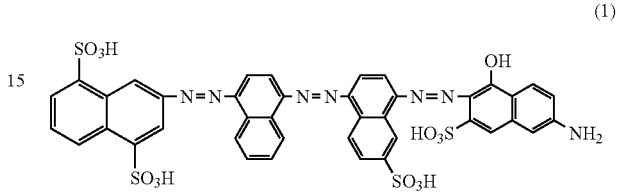

(1)

subjecting the aqueous solution or suspension to ultrafiltration to form an ultrafiltrated dye solution,
and concentrating the ultrafiltrated dye solution, with the proviso that no additional solubilizers, dispersants or tensides are added.

2. A process according to claim 1, wherein the aqueous solution or suspension of the at least one anionic crude dye is continuously or intermittently replaced or supplemented by water or buffer solution so that the volume of the batch does not change by more than 20%, and concentrating the ultrafiltrated dye solution by a factor more than 2.

3. A process according to claim 1, wherein the aqueous solution or suspension of the anionic crude dye is admixed with further cations prior to or during ultrafiltration.

4. A process according to claim 3, wherein the cations added prior to or during ultrafiltration are alkanolamines or alkanolammonium salts.

5. A process according to claim 3 wherein the cations added prior to or during ultrafiltration are triethanolammonium hydrochloride.

6. A storage-stable concentrated aqueous dye preparation of at least one anionic dye produced by a process according to claim 1.

7. A mixture, comprising the storage-stable concentrated aqueous dye preparation of at least one anionic dye produced by a process according to claim 1 and at least one additional anionic dye.

8. A mixture, comprising the storage-stable concentrated aqueous dye preparation of at least one anionic dye produced by a process according to claim 1 and at least one additional liquid direct dye.

9. A mixture, comprising the storage-stable concentrated aqueous dye preparation of at least one anionic dye produced by a process according to claim 1 and liquid versions of C.I. Direct Blue, C.I. Direct Violet, C.I. Direct Yellow and Direct Turquoise dyes.

10. A method for dyeing and/or printing a fibrous material, comprising the step of contacting the storage-stable concentrated aqueous dye preparation of at least one anionic dye produced by a process according to claim 1 with the fibrous material.

11. An ink jet ink comprising the storage-stable concentrated aqueous dye preparation of at least one anionic dye produced by a process according to claim 1.

12. A method for dyeing, coloring, pickling or staining wood, comprising the step of contacting the wood with a storage-stable concentrated aqueous dye preparation of at least one anionic dye produced by a process according to claim 1.

13. The method according to claim 10, wherein the fibrous material is a cellulosic textile or paper.

14. Wood dyed, colored, pickled, or stained in accordance with the method of claim 12.

* * * * *